(No Model.)
D. H. SMITH.
PNEUMATIC TIRE.
No. 512,491. Patented Jan. 9, 1894.
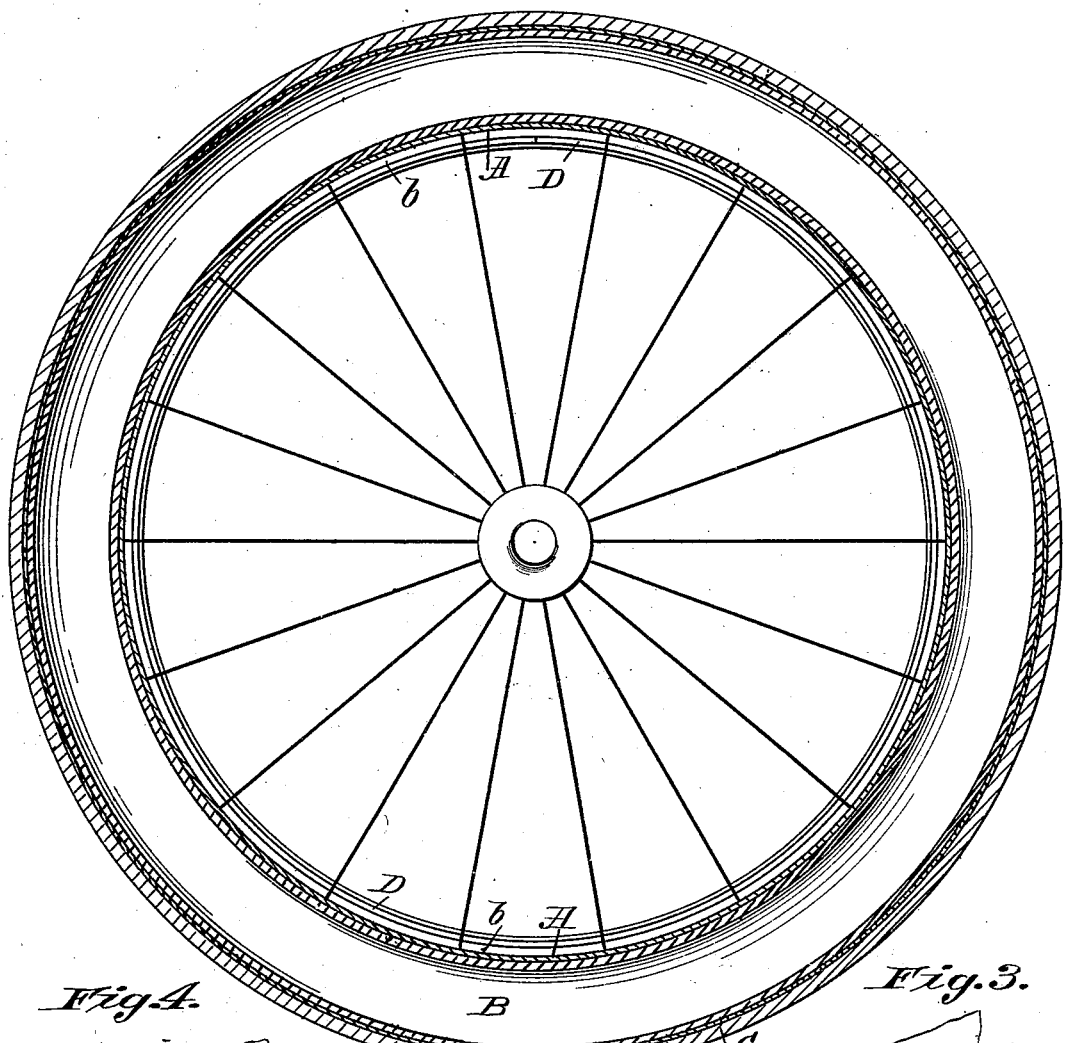
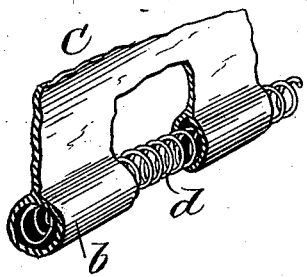
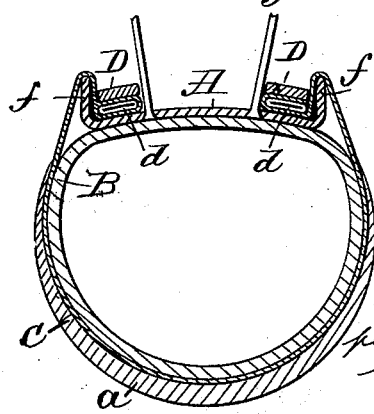
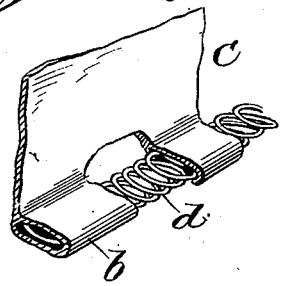
Witnesses:
Inventor:
Daniel H. Smith,
per Chapin & Co.
Attys.

(No Model.) 2 Sheets—Sheet 2.
D. H. SMITH.
PNEUMATIC TIRE.
No. 512,491. Patented Jan. 9, 1894.
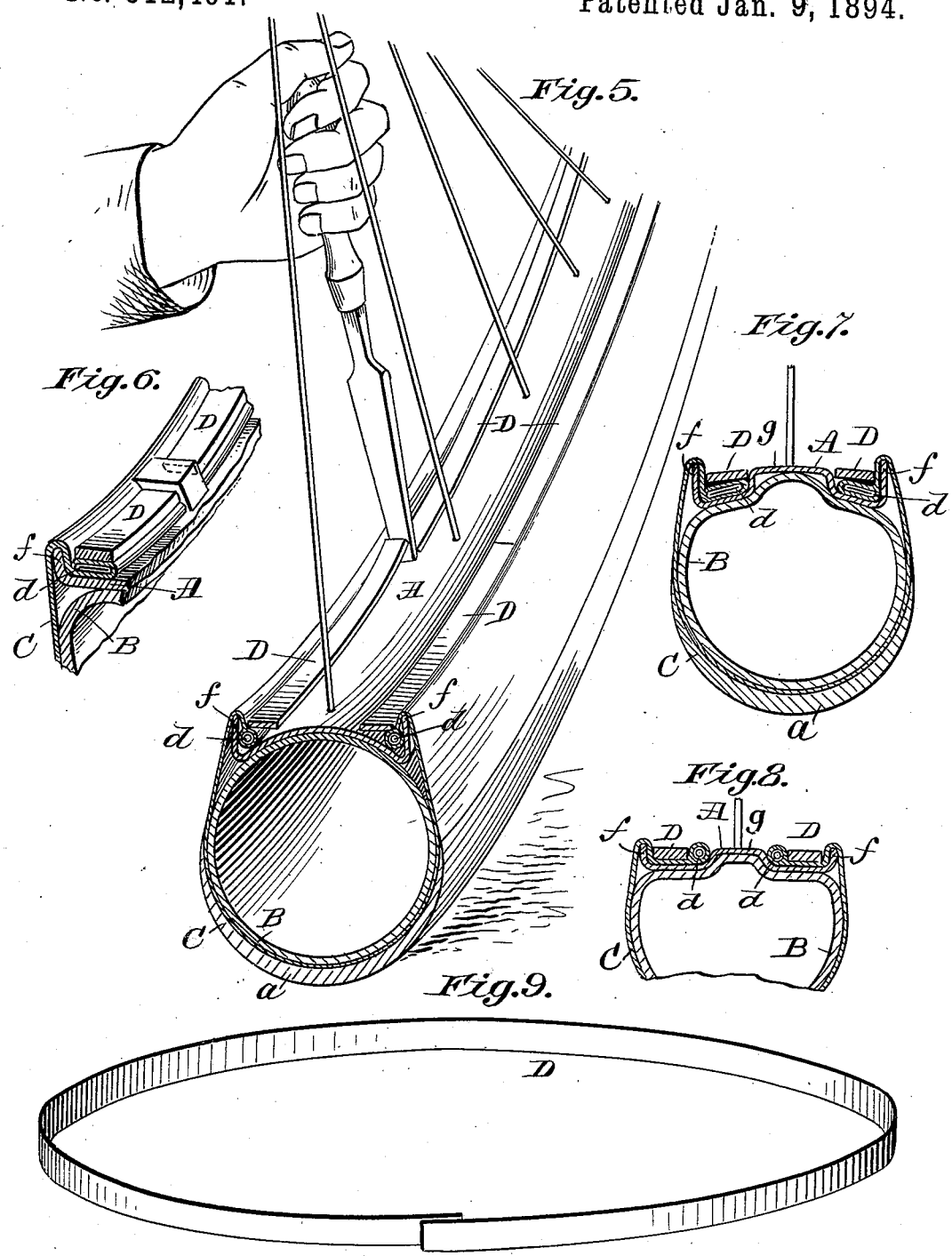

UNITED STATES PATENT OFFICE.

DANIEL H. SMITH, OF HOLYOKE, MASSACHUSETTS.

PNEUMATIC TIRE.

SPECIFICATION forming part of Letters Patent No. 512,491, dated January 9, 1894.

Application filed January 9, 1893. Serial No. 457,778. (No model.)

*To all whom it may concern:*

Be it known that I, DANIEL H. SMITH, a citizen of the United States, residing at Holyoke, in the county of Hampden and State of Massachusetts, have invented new and useful Improvements in Vehicle-Wheels having Pneumatic Tires, of which the following is a specification.

This invention relates to improvements in wheels for bicycles and other vehicles having pneumatic tires which comprise a rim, a removable air-tube and an outer covering or shoe for the air-tube which may be so disconnected from the rim as to permit the removal of the air-tube for repair or replacement.

The purpose of the invention is to provide in an improved way a beaded or thickened edge for the shoe which will be quite light, very flexible and of the requisite body or bulk and which is adaptable to different descriptions of what is known as the "clincher tire;" and the invention consists in a shoe or outer cover for a pneumatic tire having an edge thereof bead formed and constituted by a suitably attached length of spirally wound wire.

In the accompanying drawings, suitable illustrations of a practical manner of carrying out my invention are given and Figure 1 is a sectional view of a wheel having a pneumatic tire and outer shoe thereon the section being taken centrally through the rim and tire. Fig. 2 is a cross-section on a larger scale through the rim and tire. Figs. 3 and 4 are perspective views on a large scale of improved forms of the bead-edge for the tire-covering or shoe. Fig. 5 is a perspective illustration of the mode of bringing the ends of the binding-hoop into endwise abutment for retaining the circumferential bind of the hoop to confine the marginal portion of the shoe upon the rim. Fig. 6 is a sectional and perspective indication of the devices in their novel arrangement, but showing a colorable modification of the manner of endwise abutment of the binding-hoop. Figs. 7 and 8 are cross-sectional views showing modifications in the forms of some of the parts which, however, are practically no departures from the essentials of this invention. Fig. 9 is a perspective view of the retaining-hoop.

In the drawings, A represents a rim for the wheel which, as will be apparent from the several illustrations thereof, here given, is susceptible of considerable modification in its cross-sectional form.

B represents the air-tube of the tire and C the outer covering or shoe which is flexible and usually embodies, at the tread, a thickness, $a$, of rubber in any of its suitable elastic compounds, the same being molded upon, or otherwise attached to, a strip of canvas or fabric, which, with the said thickness of rubber, is made into the form of an endless band.

The shoe has its edges provided with a flexible, thickened portion, or bead, and this is preferably constituted in the manner seen in Figs. 3 and 4 by forming the marginal portions of the shoe tubular, as seen at $b$, and inclosing a spiral spring, $d$, within each of the said marginal tubes; in carrying out this invention, and even in utilizing this form of shoe for clincher tires of other descriptions than the present one, it is desirable to have, perhaps, a somewhat thick or plump bead and, in other cases, a bead as wide or wider but of less thickness. In the former case the spiral spring may be left round, as wound and as seen in Fig. 4, or the spring may be collapsed, that is, it may have its coils flattened down, as indicated in Fig. 3.

D represents the retaining band or hoop which consists of a thin strip of somewhat springy metal, as iron, steel or brass, although other material than metal might be employed with some degree of advantage; this hoop is not formed endless, that is, it is cleft or has its ends not positively united, and is of such a length as to approximate the circumferential length of the rim. The rim, as seen in the various cross-sectional views, has marginal lips, $f, f$, around which the edge portions of the aforesaid shoe are brought so as to have the beads thereof located within the inner periphery of the rim to be borne against and retained by the binding-hoop. Having brought the one beaded edge of the shoe around the lip, as just described, the hoop is placed thereover and forced into circumferential tensional engagement therewith by exerting a suitable prying action, as indicated in Fig. 5 to bring the ends of the hoop into endwise abutment, which manner of abutment is seen in Fig. 1; or the abutment of the ends of the hoop, instead of being the one against the other, may be against an abutment piece suitably provided therefor and formed on, or attached to, the rim. This, which may be termed a circumferential expansion of the hoop, is, in a measure, permitted by the elasticity, or capability for compression, of the shoe at or adjacent its beaded edge. The hoop may be held against transversal displacement if deemed requisite, and as I have practiced the invention I have so provided, and the means to this end may consist in having the spoke at a distance from the marginal lips of the rim, substantially corresponding to the width of the hoop or, as seen in drawings Fig. 8, the rim has at each side of its median plane a channel, one boundary of which is constituted by the lip and the other by the border of the intermediate annular rib or prominent portion, g. In this particular form the hoop does not bear directly upon the beaded edge, but it bears upon a portion of the shoe next thereto and in a direction therefrom toward the middle of the shoe, but the circumferential bind by the hoop to confine the shoe to the rim effects the result by substantially, though not precisely, the same manner of means as where the hoop bears directly against and upon the beaded edge. The rim having the inturned lips around and within which the bead-edged portions of the shoe are brought in combination with the binding-hoop arranged and operating as described in addition to constituting a very cheap, simple and light construction also imparts a not unsightly appearance to the wheel.

I may employ my shoe having the beaded edge or edges constituted by convolutions of wire with various other forms of rims.

I am aware that heretofore in the construction of what are known as "clincher tires" the shoe has been retained by having a beaded-edge to engage a suitable lip or part of the rim and there retained by a strip which is removable from the rim, but which is held in place by clamping screws or other form of mechanical and positive locking devices which either require special tools or a more or less complicated and protracted manipulation for the detachment of the shoe; I am also aware that beaded or thickened edges have been engaged with a hook or lip of the rim and retained in place by the inflation of the air-tube, the shoe being removable on deflation and none of these arrangements do I claim; but What I do claim, and desire to secure by Letters Patent, is—

1. In a tire, the combination with a rim, an air-tube, and a shoe which has one or both of its edges formed tubular and inclosing a spiral spring, the beaded-edge engaging a suitable lip therefor which is provided on the rim.

2. A shoe for a pneumatic tire having a flexible and beaded edge thereof constituted by a spiral spring, the convolutions of which are flattened or collapsed, substantially as described.

3. A shoe for a pneumatic tire having a flexible and beaded edge constituted by a spirally wound and suitably attached wire, substantially as described.

DANIEL H. SMITH.

Witnesses:
WM. S. BELLOWS,
K. I. CLEMONS.